April 8, 1958     H. P. ROCKWELL, JR     2,830,150
CIRCUIT SEQUENCE CONTROLLER
Filed Oct. 26, 1953     7 Sheets-Sheet 1

INVENTOR
HARVEY P. ROCKWELL JR.
By Herbert A. Minturn
ATTORNEY

INVENTOR
HARVEY P. ROCKWELL JR.
By Herbert A. Mintura
ATTORNEY

April 8, 1958   H. P. ROCKWELL, JR   2,830,150
CIRCUIT SEQUENCE CONTROLLER
Filed Oct. 26, 1953   7 Sheets-Sheet 3

INVENTOR
HARVEY P. ROCKWELL JR.
By Herbert A. Minturn,
ATTORNEY

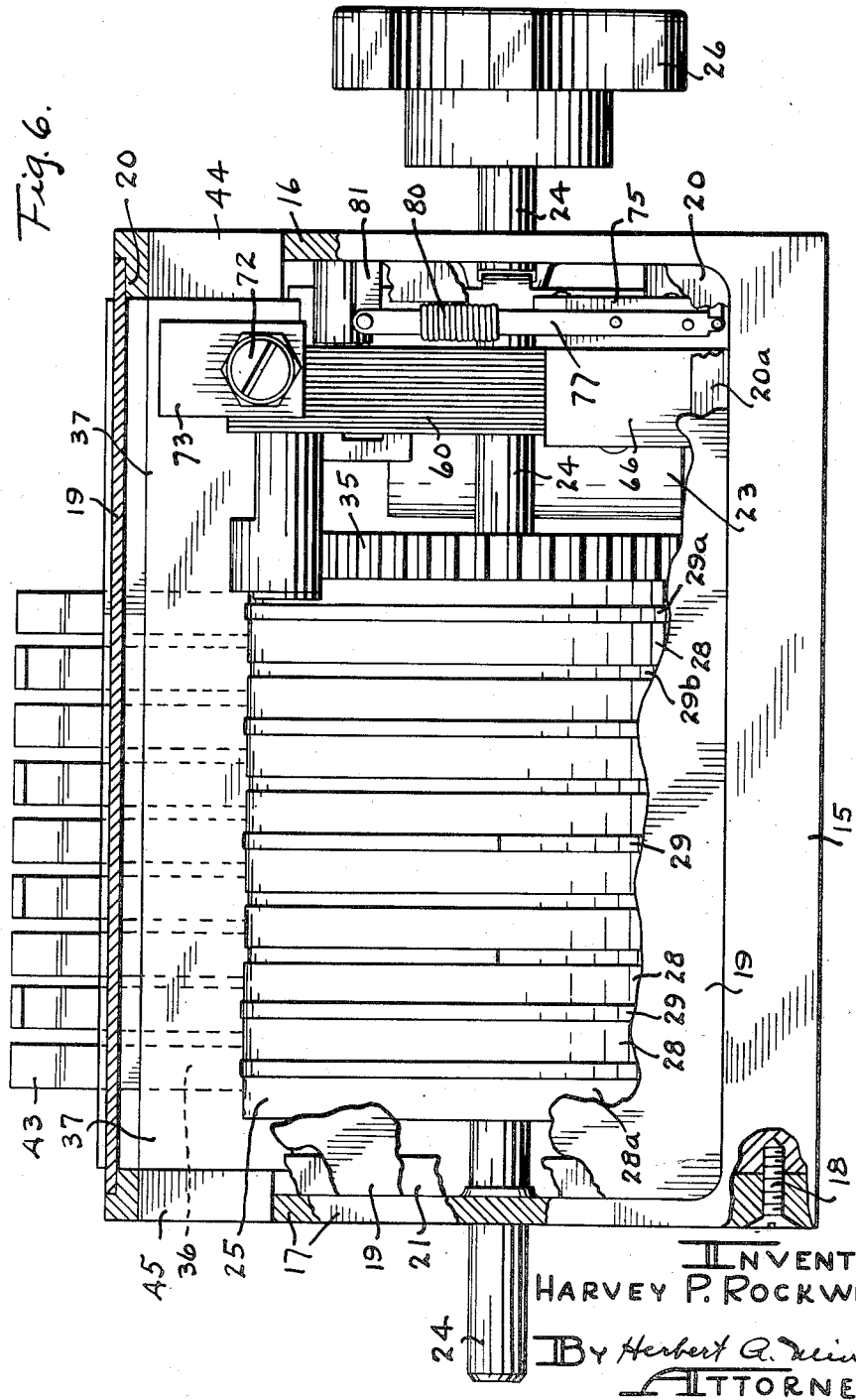

April 8, 1958 H. P. ROCKWELL, JR 2,830,150
CIRCUIT SEQUENCE CONTROLLER
Filed Oct. 26, 1953 7 Sheets-Sheet 5
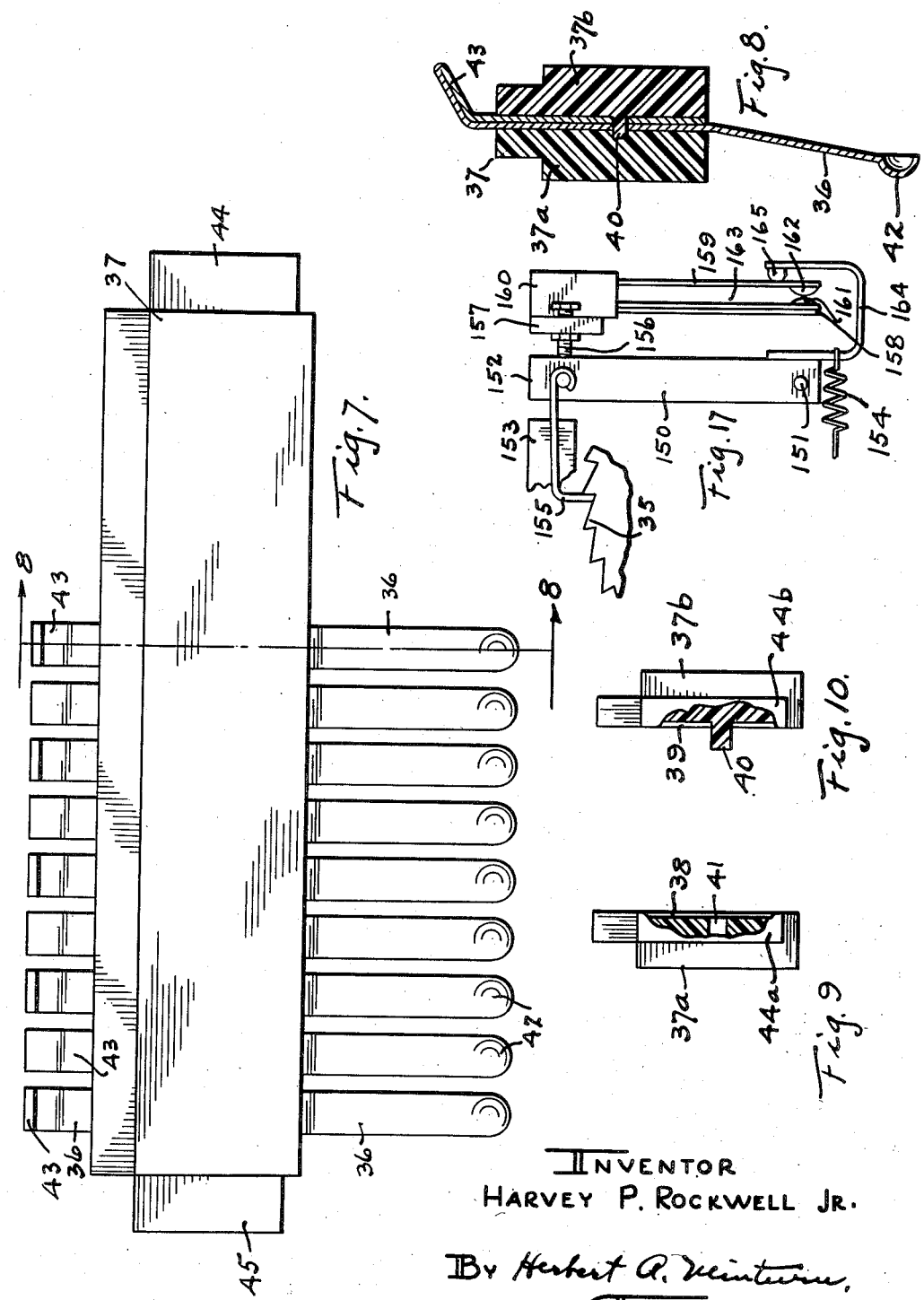
INVENTOR
HARVEY P. ROCKWELL JR.
By Herbert A. Minturn,
ATTORNEY

INVENTOR
HARVEY P. ROCKWELL JR.

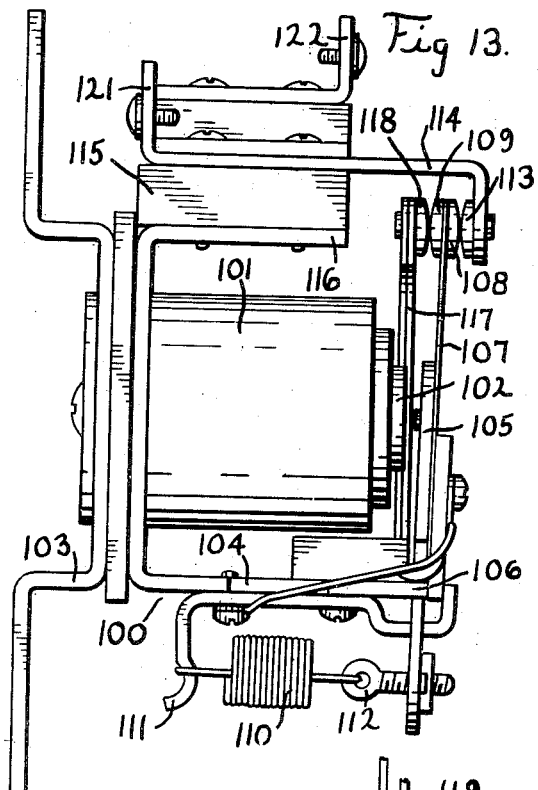
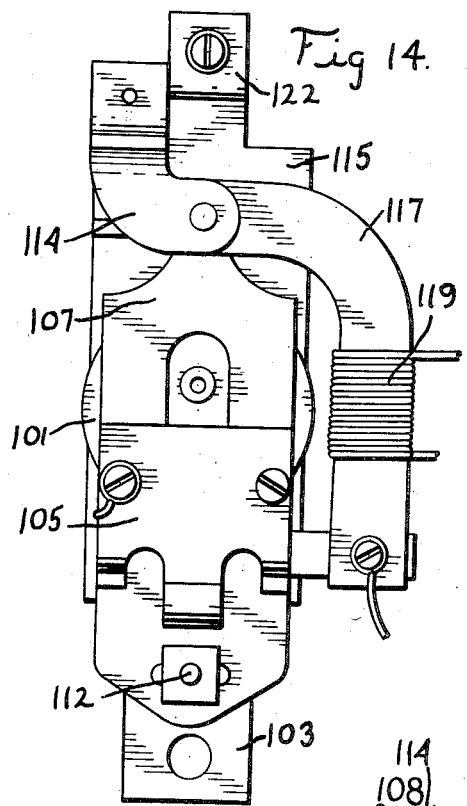
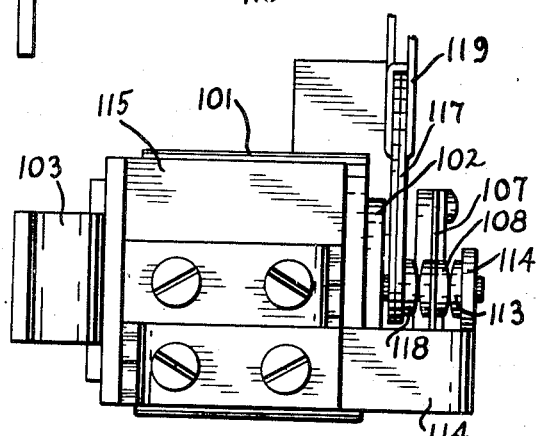
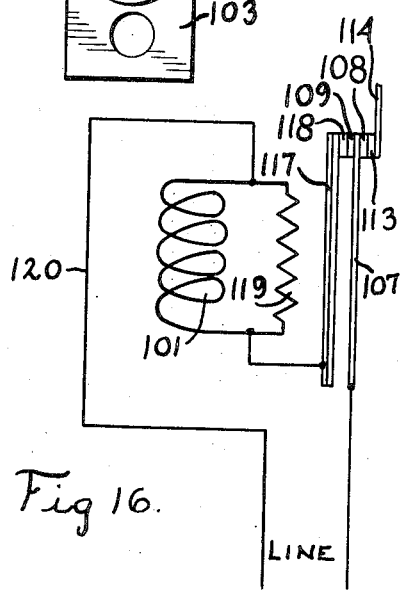

United States Patent Office 2,830,150
Patented Apr. 8, 1958

2,830,150

CIRCUIT SEQUENCE CONTROLLER

Harvey P. Rockwell, Jr., Indianapolis, Ind.

Application October 26, 1953, Serial No. 388,156

2 Claims. (Cl. 200—88)

This invention relates to a structure for controlling a plurality of circuits in sequence such, for one example, as may be required in timing the various operations in an automatic washing machine wherein hot water, cold water, agitation, rinsing, draining, drying, and signalling the end of various operations may be desired.

The invention embodies a timing structure comprising an electro-magnet, a pair of time controlling contact members normally closed, the pressure between which members is increased upon energization of the winding of the magnet, a heating element, the energization of which follows with the energization of said winding and, following an interval of time, causes said members to separate to deenergize both said winding and said element and accelerate or snap apart said members from their initial separation.

The invention embodies further a timer wherein there is a drum having a plurality of conducting members pressing against circuit included cams, an armature rocking type motor for revolving the drum step by step, a heater coil control of the motor for timing, and various other elements for embodying these parts in a small, compact working unit.

A primary object of the invention is to provide a structure of the above indicated nature which may be extremely reliable throughout a long period of life and which may be employed as an accurate timing device, for controlling various circuits as to duration of the closed and opened circuits all in a rugged structure.

A further important object of the invention is to provide such a structure having relatively small overall dimensions so that the device may be incorporated in a minimum of space. A still further important object of the invention is to provide means for resetting the timer, and for holding the timer in an "off" condition at will.

These and many other objects and advantages of the invention will become apparent to those skilled in the art in the following description as illustrated in the accompanying drawings, in which Fig. 1 is a view in top plan and partial section of a structure embodying the invention;

Fig. 6 is a view in side elevation of the structure and in partial section;

Fig. 7 is a view in side elevation of the contact finger assembly;

Fig. 8 is a view in vertical section on the line 8—8 in Fig. 7;

Fig. 9 is a view in end elevation and partial section of one of the members of the contact finger holder;

Fig. 10 is a view in end elevation and partial section of the companion member of the contact finger holder;

Fig. 13 is a view in side elevation of the modified form of the timer motor;

Fig. 14 is a view in front elevation of the modified form;

Fig. 15 is a top plan view;

Fig. 16 is a wiring diagram of the motor; and

Fig. 17 is a detail of means controlling arcing between motor control contact points.

Figure 1:
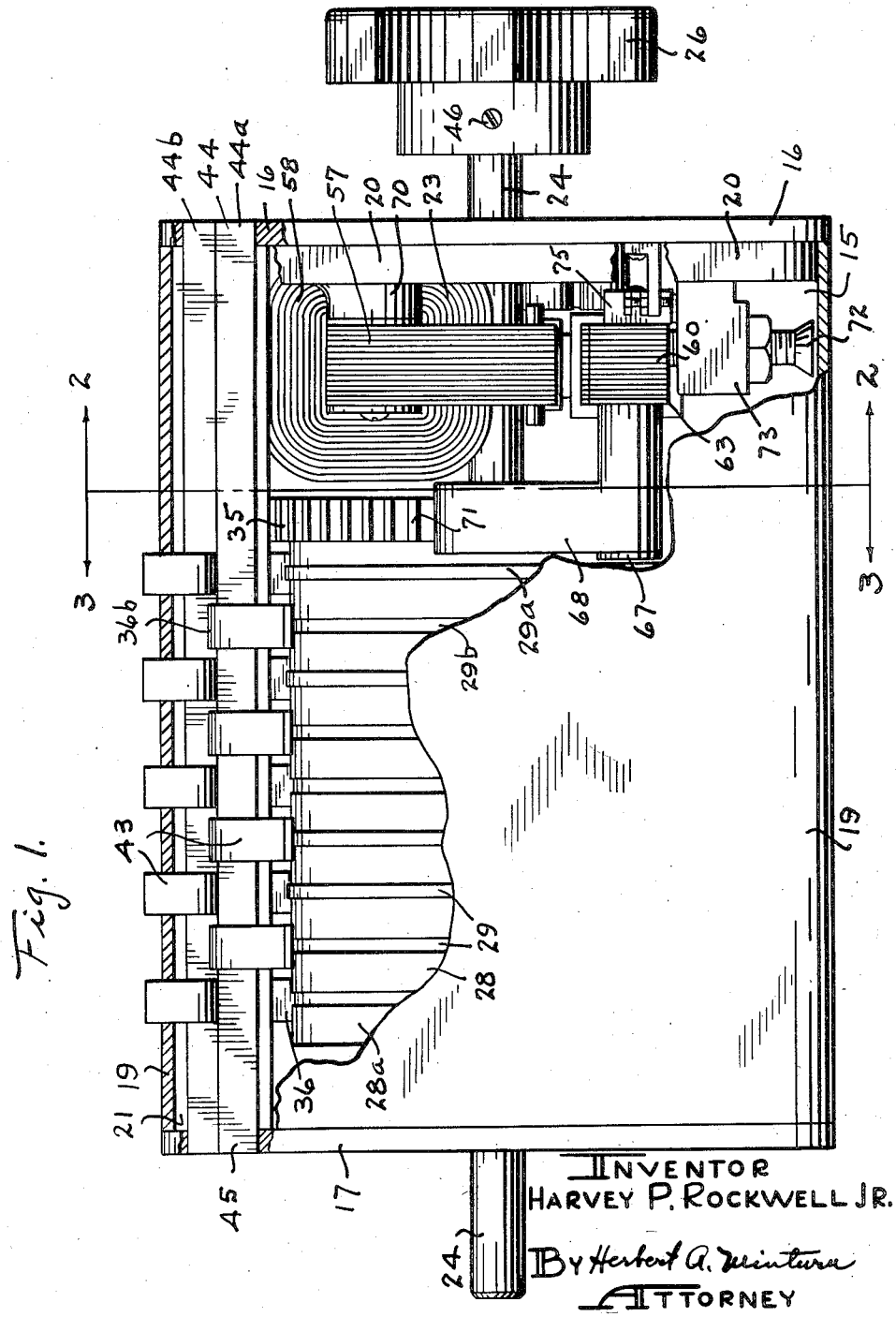

There is provided a mounting base 15 from which, at the right hand end thereof in Figs. 1 and 6, there is an integral upturned end 16, and there is an opposite, left hand end piece 17 secured to the base 15 by any suitable means, herein shown as by screw means 18. A generally U-shaped cover 19 engages between the ends 16 and 17 around rabbetted inturned flanges 20 and 21 on the lower rabbetted surfaces 20a and 22 of the base 15.

Within the housing thus formed there is mounted at one end, the right hand end as viewed in the drawings, a motor designated generally by the numeral 23. A shaft 24 extends horizontally through the housing, supported by the ends 16 and 17, to carry a switch drum 25 within the housing. An operating knob 26 is fixed to the shaft 24 on that end which extends externally of the housing end 16.

The drum 25 is built up of parts designed to result in a drum of light weight so as to have a low moment of inertia in respect to its starting of turning from a stopped position. To this end, the drum 25 embodies the following arrangement of elements.

There are a number of annular electrical conducting cam rings 29, herein shown as nine in number, spaced apart by dielectric annular rings 28, compressibly held between end plates 30 and 33 by means of through rivets 34 passing through the plates 30 and 33 and the intervening conducting and non-conducting rings 29 and 28.

This assembly provides a hollow drum, and while the rivets 34 may electrically interconnect one with the other all of the rings 29, a more certain and radially compressive interconnection is made by inserting into the interior of the drum, a metal coil spring 27 of such diameter that when it is compressed between the end plates 30 and 33, it will extend and remain by its turns compressibly across and against the inner exposed edges of the conducting rings 29. The radial dimension of the insulating and separating rings 28 being less than the radial dimension of the rings 29 so that the interior edges of the rings 29 extend inwardly beyond the ring 28 edges.

Figure 5:
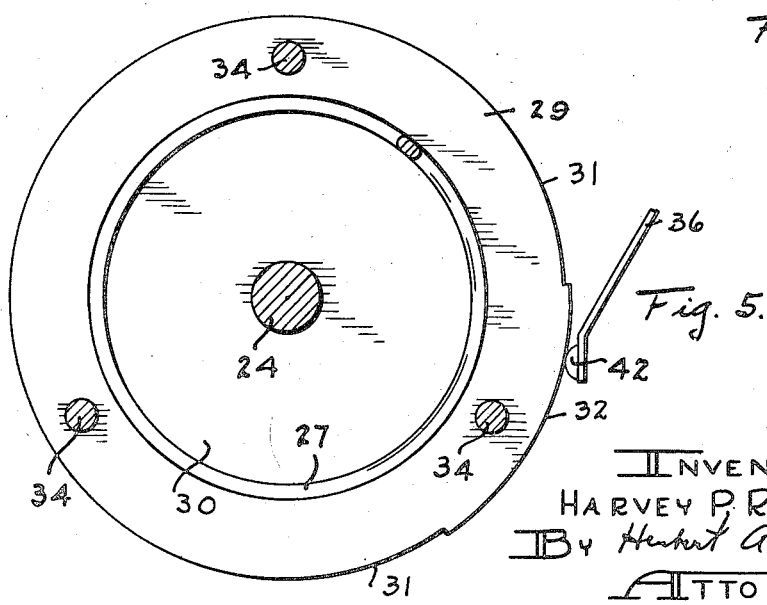
Fig. 5 is a vertical transverse section on the line 5—5 in Fig. 4.

The conducting rings 29 have outer edges formed with contours which extend outwardly beyond the separating and insulating rings 28 by circumferential lengths of that magnitude which depend upon the length of the closed circuit period of time desired to be controlled by each of the rings 29 during turning of the drum 25. A typical cam ring 29 is illustrated in Fig. 5, wherein the outer edge surface length 31 is of a diameter slightly less than the diameter of the spacing rings 28, and wherein the surface length 32 has a greater radius of curvature than that of the length 31 to cause the length 32 to extend outwardly beyond the peripheries of the spacer rings 28. In the example herein shown and described one of these cam rings 29a has its entire peripheral surface a constant diameter outer edge surface extending beyond the outer surfaces of the separating rings 28 to set up by this cam ring 29, a constant closed circuit condition, as will later herein become more apparent.

The plate 33 is fixed to the shaft 24 to fix the drum longitudinally of the shaft 24. This plate 33 has its periphery formed into ratchet teeth 35 and is herein after termed a ratchet wheel 35. It is through this ratchet wheel 35 that the drum 25 is rotated.

A plurality of electrical conducting contact fingers 36, serving as brushes, one for each cam 29, nine in all in the present showing, are provided to be yieldingly held against the drum 25 in the paths of the cams 29. These fingers or brushes 36 are supported by a common dielectric holder generally designated by the numeral 37, best shown in Figs. 7 and 8.

This holder 37 comprises two members namely 37a and 37b, Fig. 8–10, to have vertically disposed grooves 38 and 39 thereacross one matching the other when the members 38a and 37b are brought together, there being a post 40 carried by the member 37b entering a receiving hole or socket 41 in the member 37a in such alignment as to have these grooves 38 and 39 to match one another to form a common passageway vertically through the holder 37 when the members 37a and 37b are brought together, face to face. The member 37 carries a plurality of these matching grooves 38 and 39 vertically therethrough, one set for each of the nine brushes 36.

The brush 36 is preferably made out of a spring-like material to have a contact button 42 at the lower end of each brush and to have the upper portion of the brush 36 folded back upon itself to give a double thickness through the grooves of the member 37, this double portion having a width and a thickness which will permit it to be received snugly in the companion grooves 38 and 39 as indicated in Fig. 8, the brush 36 in each instance having a hole formed therethrough, through which hole the post 40 may pass so as to retain the brush 36 against vertical travel through the member 37. The upper end portion of the brush 36 in each instance is preferably bent alternately one brush to one side and one brush to the other side to form the terminals 43. The pairs of slots or grooves 38 and 39 are spaced along the member 37 so as to have a sufficient clearance between adjacent brushes 36 to prevent any danger of arcing or current jumping from one brush laterally to the next brush.

The assembly of brushes 36 between the two holder members 37a and 37b is carried between the ends 16 and 17 by having reduced end portions 44 and 45, rectilinear in shape fitted through corresponding openings in the ends 16 and 17, the holder end portion 44 being made up accordingly of the companion ends 44a and 44b. The end 45 is made accordingly. The member 37 is thus held between the ends 16 and 17 in a vertical position with the terminals 43 extending upwardly, through the cover 19, while the lower end portions carrying the buttons 42 are yieldingly urged against the drum 25.

In order to permit quick assembly and disassembly of the drum 25 from the housing base 15 and the end 16, the knob 26 is detachably mounted on the shaft 24 by any suitably means such as by with a set screw 46, Fig. 1, and the shaft 24 on which the drum 25 is assembled is revolubly carried by the ends 16 and 17.

The drum 25 is mounted along the shaft 24 in spaced relation from the end 16 so that there is sufficient room to place the motor 23 between the right hand end of the drum 25 and the housing end 16. The driving motor 23 has a core made up of a plurality of laminations 57a herein shown as being inverted L-shaped with a horizontal leg 57 and a winding 58 on the vertically disposed legs 59.

An armature generally designated by the numeral 60 is formed from a plurality of side by side placed laminations of identical shape and size as are the laminations 57 which carry the winding 58. The vertical leg 63 of the armature 60 when the magnetic flux path is completed through the armature and the core laminations 57a, is substantially parallel with the leg laminations 59, and the horizontal leg 62 of the armature 60 is parallel with the upper disposed leg of the laminations 57 in each case, the left hand ends of the laminations of the leg 62 being approximately in contact with the lower end of the leg 59 whereas the left hand face of the upper end of the leg 63 of the armature 60 will be in abutment with the right hand end of the horizontal leg 57.

Figure 2:
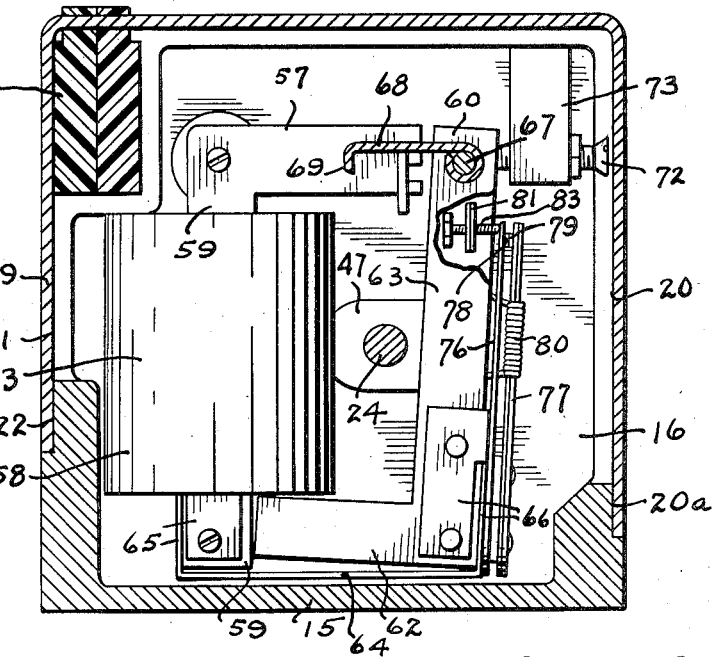
Fig. 2 is a vertical transverse section on the line 2—2 in Fig. 1.
Figure 3:
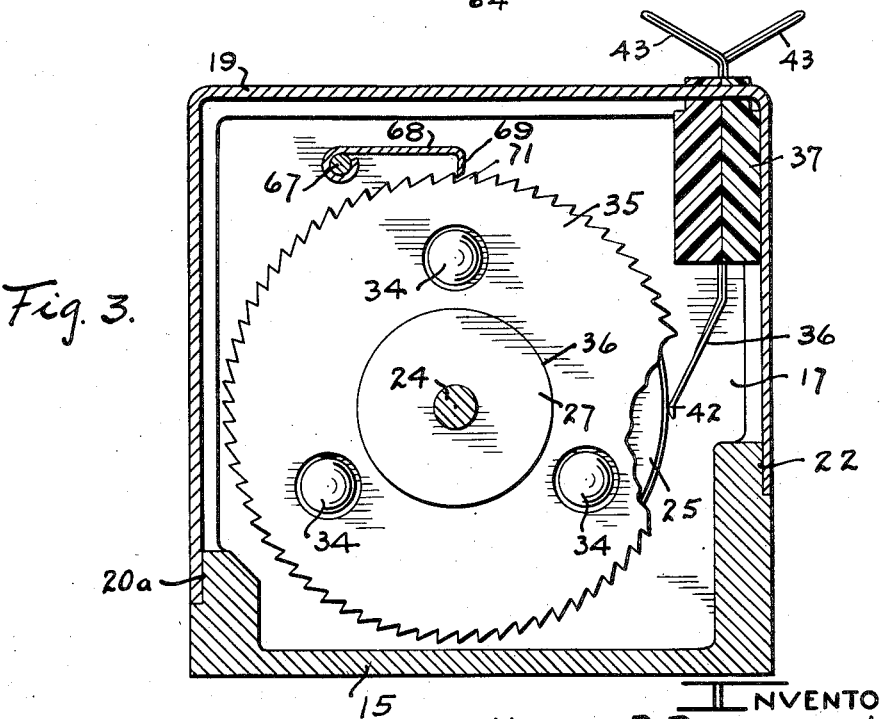
Fig. 3 is a vertical transverse section on the line 3—3 in Fig. 1.
Figure 4:
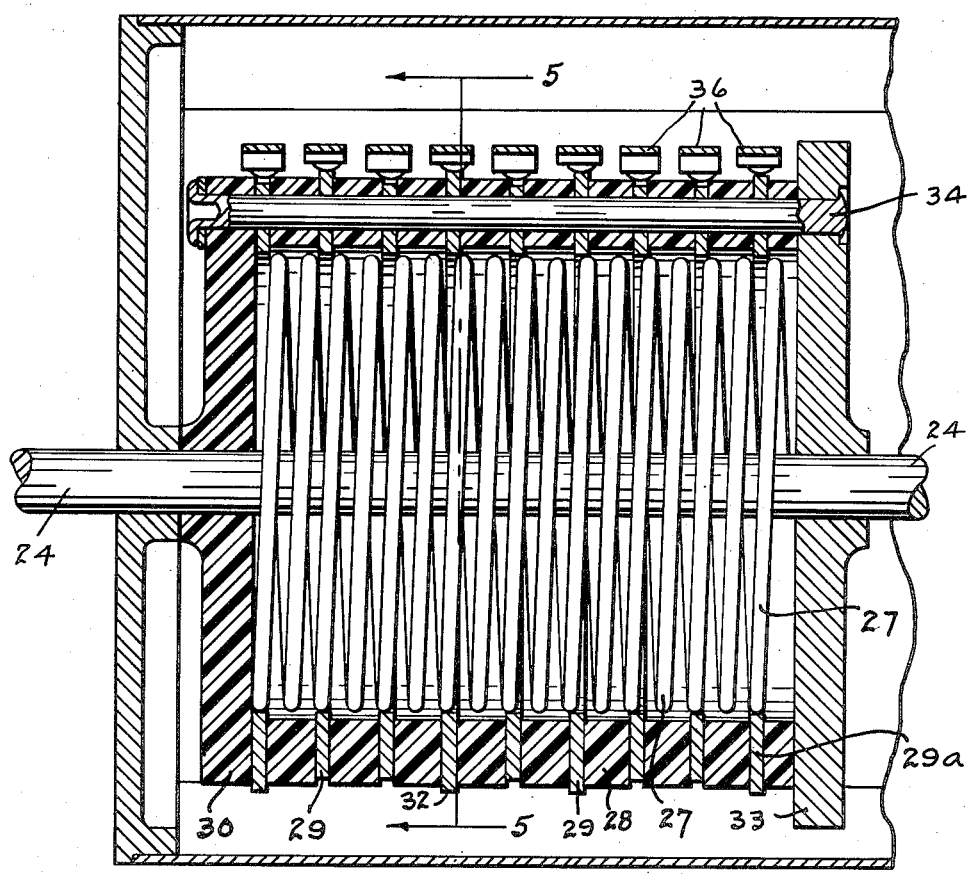
Fig. 4 is a view in central horizontal section through the switching drum of the device.
Figure 11:
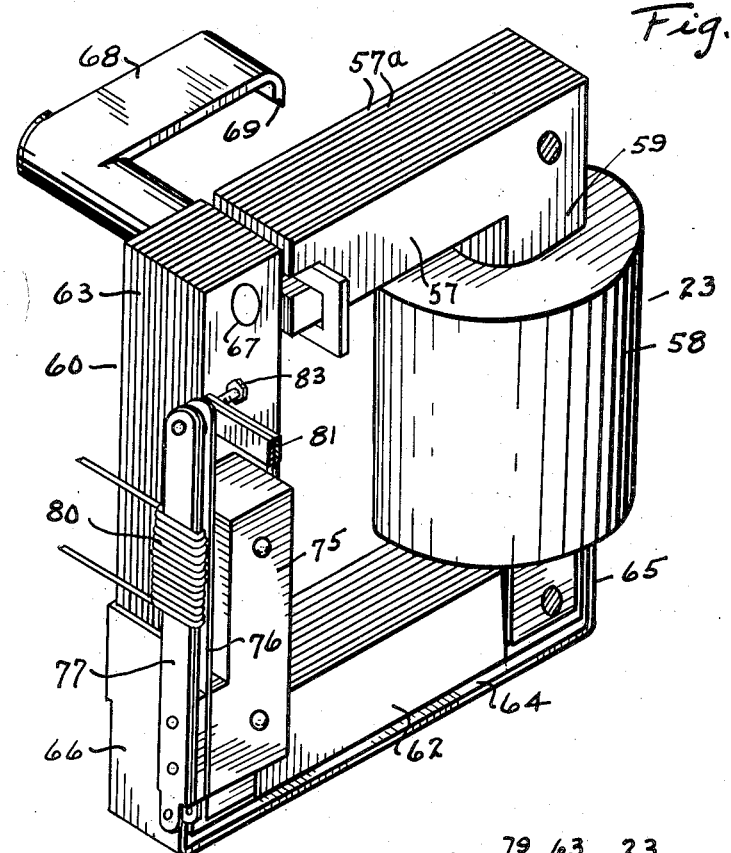
Fig. 11 is a view in perspective of the operating motor.

However the armature 60 is normally held in a rocked position as indicated in Fig. 2, whereby there is a gap primarily between the side of the upper end portion of the leg 63 and the end of the leg 57. The armature 60 is mounted to be normally rockably held in that open position by any suitable means such as by hinging and spring urging, herein shown in combined form as comprising a leaf spring 64 which has an end bracket 65 engaging the lower end of the leg 69, and an opposite end bracket 66 which engages the lower end of the leg 63 at the extreme right end of the horizontal leg 62, this spring 64 being spaced below the leg 62, so as to permit flexing of the spring 64 in rocking the armature 60 from the "open" position indicated in Figs. 2 and 11 to a closed position where the upper end portion of the leg 63 is in abutment with the leg 57. The spring 64 constitutes the sole support for the armature 60.

On the upper end of the substantially vertically disposed leg 63 of the armature 60 there is a pin 67 extending horizontally therefrom and around which is swivelled a pawl 63 with a downturned lip 69. This lip 69 is free to drop downwardly onto the ratchet wheel 35.

Normally a spring (not shown) yieldingly urges the pawl 68 against the wheel 35. The core laminations 57a are rigidly mounted in position by being mounted on a boss 70 which extends to the left from the end 16, Fig. 1, so that the core carrying the winding 58 is in a rigid, fixed position whereas the armature 60 is free to rock to carry the pawl 68 substantially horizontally across the path of the teeth 71 on the periphery of the wheel 35. A screw 72 is adjustably carried through a post 73 fixed to the end 16 to have a terminal end against which the outer or right hand face of the leg 63 may bear in its outwardly rocked position Figs. 1 and 2. By adjusting the screw 72, the degree of travel of the leg 63 is controlled.

On the side of the armature 60, herein shown on the right hand side, there is mounted an insulating block 75 carrying in spaced apart relation, insulated one from the other a spring contact member 76 and a bi-metallic member 77, both extending upwardly a distance to have contact points 78 and 79 normally bearing one against the other. Around the bi-metallic member 77 is placed a heater coil 80 as a means for heating the member 77, this member being so constructed that when it is heated it will tend to bend away from the member 76 to space the contacts 78 and 79 one from the other, to achieve an open circuit condition as between the members 76 and 77. A bar 81 fixed to the end 16 extends from that end 16 toward the armature 60 to carry an adjusting screw 83 therethrough to have an end in the path of the member 76 whereby that member 76 may be adjustably positioned in respect to the positioning of its contact point 78. The bar 81 may be in part at least a bi-metallic member whereby it may warp toward the member 76 with increasing ambient temperature and thereaway in a cooler or lower temperature. This is for the purpose of automatically compensating for changes in temperatures in the surrounding atmosphere where the controller is being used.

Figure 12:
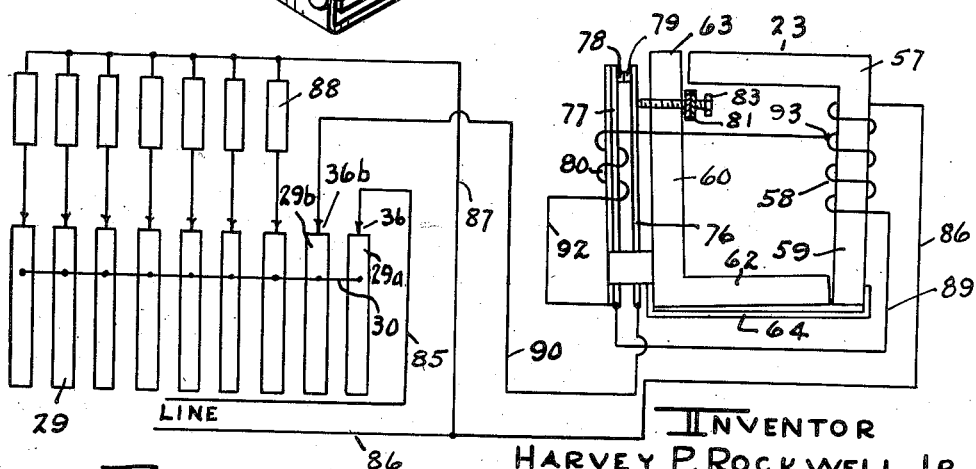
Fig. 12 is a wiring diagram of the structure of Fig. 1.

Referring to Fig. 12, one side 85 of a power line is carried to the brush 36 bearing on the end cam 29a. The other side 86 of the line leads to one terminal of the coil 58 of the motor 23, by a branch 87 to the various electrically responsive devices 88 which would normally be solenoids in most instances to control switches and valves or the like, and through those devices 88 to the other brushes 36 with the exception of the brush 36b. All of these brushes 36 connect to the line side 85 through the interconnecting pin 30. From the other terminal of the winding 58, there is a wire 89 leading to the bi-metallic member 77, and the circuit is continued through the contact members 78 and 79 through the member 76, the wire 90 through the brush 36b bearing on the cam 29b next adjacent the cam 29a. In the normal positions of the various members, with the exception of the cam 29b a closed circuit is thus established. The cam 29b has a length of peripheral surface to make electrical contact with the brush 36b for a sufficient length of time to permit all of the various units 88 to operate in sequence as laid out by the various surfaces of the cams 29, and then that surface terminates on the cam 29b so that there is a gap wherein the circuit is allowed to remain open between the cam 29b and the brush 36b so that the entire controller stops making and breaking circuits through the members 88. When the controller is to be set into operation again the knob 26 is turned to the beginning of the electric contacting surface of the cam 29b with the brush 36b whereupon the controller will automatically go through its sequence of operations of controlling the opening and closing of the circuits through the members 88 as designed.

The motor 23 operates as follows: Normally the contact members 78 and 79 bear one against the other. This means that when a circuit is closed between the cam 29b and the brush 36b, current flows through the winding 58 which causes the armature 60 to move and flex the spring 64 to bring the upper end 63 into contact with the arm 57 of the core on which the winding 58 is mounted. Simultaneously, a circuit is maintained between the wire 89, wire 92, heater coil 80, and a tap 93 of the winding 58 so that the coil 80 is energized to start heating the bi-metallic member 77.

This heating requires an interval time which is substantially constant at each heating operation, and finally causes the member 77 to warp to carry its contact member 78 away from the member 79 to open the circuit through both the coil 80 and the coil 58 and allowing the spring 64 to force the armature back to its "open" magnetic condition. Thus the spring 64 tends to separate the contact members 78 and 79 more rapidly following initial separation to prevent undue arcing between those members when the member 77 warps slowly under the influence of the heat induced by the coil 80 when energized. Also it is to be noted that when the armature 60 rocks against the member 57, to close the magnetic circuit, the member 76 is more firmly pressed against the adjusting screw 83 so that an extremely firm contact is made between the members 78 and 79. This "pressurized" contact is induced by the member 64. Thus by suitably adjusting the screw 83 together with the proper mounting and design of the bi-metallic member 81, the point at which the member 78 and 79 separate is controlled under varying ambient temperatures.

Thus it is to be seen that upon each rocking of the armature 60, the pawl 68 will travel over the teeth 71, the required number, one or more as the design may be, and then when the heater coil 80 has sufficiently heated the member 77, to break the circuit, the pawl 68 will pull backwardly under the influence of the spring 64 and thus revolve the wheel 35 and the drum 25 a corresponding distance to carry the drum cams around accordingly under the brushes 36. The length of the electrical contacting portions of the cams 29 will of course be designed to give that length of contact with the brushes 36 in this travel which is required to maintain the units 88 in energized conditions for the results desired.

Reference is now made to Figs. 13–16 which illustrate a modified form of a timer motor, this modified form being generally designated by the numeral 100.

In this form, an electro-magnet, having a winding 101 and a fixed core 102, is mounted on a bracket or base 103. A lower foot 104 extends outwardly from the bracket 103 and rockably carries an armature 105 on its front or outer end 106 to extend above and below the foot 104.

The upper end of the armature 105 carries a spring member 107 having an upper contact button 108 on one side and a contact button 109 on the other side. An armature tension spring 110 has one end secured to an arm 111 which is adjustably fixed along the foot 104 and by its other end to an eye bolt 112 which is engaged with the lower end portion of the armature 105 below the foot 104 and is so tensioned by means of the bolt 112 as to rock the armature normally to carry the contact 108 compressively against the back contact 113. This contact 113 is fixed on the arm 114 which in turn is fixed on the insulating block 115 attached to the finger 116 carried by the base 103.

A bimetallic arm 117 has its lower end portion fixed to the foot 104 and carries a contact 118 at its upper end normally bearing against the contact 109. A heating element 119 is fixed to the bimetallic arm 117, interconnected in parallel with the magnet winding 101, Fig. 16. The arm 117 is designed to warp away from the spring member 107 upon being heated for a time interval by the element.

The operation of the timing motor 100 is that, upon current flowing from the line, Fig. 16, to the motor, a circuit is closed through the conductor 120; both the winding 101 and the heating element 119; the bimetallic member 117; contacts 118 and 109; and the spring arm 107. In this closed circuit, both the winding 101 and the element 119 are energized with the result that the armature 105 swings toward the core 102 to open a circuit through the contacts 108 and 113 and presses the contact 109 more firmly against the contact 118, mechanically bending the bimetallic member slightly to space apart the contacts 108 and 113.

Simultaneously, the bimetallic arm 117 is being heated by the element 119. When the arm temperature reaches the required degree, the arm 117 bends in the direction of carrying its contact 118 away from the contact 109, but with the contact 109 following the contact 118 still pressed thereagainst until the finger 107 has been relieved of its bending stress initially set up by the attraction of the armature 105 toward the core 102 in opposition to the pull therefrom by the spring 110. This distance however is quite slight.

However, the instant the bending action of the bi-metallic arm 117 reaches that degree to separate the contact 118 from the contact 109, current flow is interrupted to both the magnet winding 101 and the element 119, with the result that this separation of contacts 118 and 109 is greatly accelerated by reason of the pull of the spring 110 tending to snap the finger 107 back and quickly move the contact 109 away from the contact 118, not only in an arc quenching action but also causing the contact 108 to strike the contact 13 with some impact. Then the bimetallic arm cools sufficiently through an interval of time to bend back and carry the contact 118 against the contact 109 to reestablish the circuit described to reenergize the winding 101 and the element 119.

Thus, in timed sequence, the motor 100 opens and closes the external circuit contacts 108 and 113 through which the timing of devices in circuit therewith is set up. Obviously a plurality of pairs of contacts 108 and 113 may be employed as required, or the motor 100 may have its contacts 109 and 113 open and close a circuit including the winding 58 of the motor 23, in which case the elements 76, 77, and 78 could be eliminated, as will be readily apparent to those versed in the art. The terminal block 115 carries the terminal 121 as an upward extension of the member 114 which carries the contact 113, and also which carries a second terminal 122 to which the finger 107 may be connected so that these terminals will be available for interconnecting the contacts 108 and 113 into a circuit (not shown) which is to be controlled by the motor 100.

A variation in timing may enter into the motor operation by reason of variations in performance of the bimetal element 77 or 117 in either form of the motor, this variation arising such for example in fabrication of the element by different factories, in possible minute differences in dimensions, or in chemical analysis of the metals, or in degree of union one metal with another, and the like. Thus, to achieve the possibility of uniform timing, it has been discovered that a simple addition to the operating motor will permit achieving that end.

Referring to Fig. 17, there is diagrammatically illustrated a rockable armature 150 hinged at 151 to have its end 152 normally urged away from the magnet pole 153 by a spring 154. The armature carries the pawl 155 which rides over the ratchet teeth 35. The permissible gap between and hence the degree of travel of the armature to and from the pole 153 is adjustably fixed by the screw 156 which is carried by a member 157 fixed in relation to the pivot pin 151 and the pole 153.

A bi-metal arm 158 and a spring arm 159 are carried by a block 160, one arm electrically insulated from the other. These arms 158 and 159 in the present showing normally close an electric circuit between each other at their free ends through the respective contacts 161 and 162, with the arm 159 under bending tension compressing its contact 162 against the contact 161, this circuit being as described above to energize a winding about a core from which the pole piece 153 would be presented.

The heater element 163, upon energization, will within a predetermined time interval heat and cause the bi-metal arm 158 to tend to warp from the arm 159, and eventually will cause the contact 161 to be shifted beyond the return of the spring arm 159 to its normal neutral position in respect to its bending, to that degree whereby the contacts 161 and 162 are separated thus demagnetizing the pole 153. The movement of the bi-metal arm 158 is relatively slow and detrimental arcing may occur between the contacts 161 and 162. Moreover, if there be a slight variation in the behavior of the bi-metal arm 158 in reference to a calibrated arm action, then there will be a deviation in the timing of the initiation of travel of the armature 150 in either direction, and this deviation needs to be corrected.

The correction may be secured by use of an arm 164 of a rigid nature, fixed to the armature 150 to rock therewith. This arm 164 in the form herein shown extends around and back of the spring arm 159 and carries preferably an insulating button 165 to bear against the spring arm 159 on its side opposite from the arm 158. This button 165 may be adjustably positioned longitudinally along the spring arm 159 by any suitable means such as by bending the arm 164 up or down. This adjustment remains permanent for any one particular bi-metal arm 158.

By shifting the button 165 upwardly along the arm 159, its radial distance from the pivot 151 is increased to in turn increase its travel against the spring arm 159 upon the same degree of rocking of the armature 150, and thereby cause the contact 162 to follow the contact 161 in closed condition a greater distance under bending of the arm 158 than when the button 165 is in a lower position along the arm 159.

In this manner, a compensation is to be had for variations in the bi-metal arm 158 operation in respect to timing of the cycle of rocking of the armature toward and away from the pole 153, and hence of degree of rotation of the ratchet wheel 35 in the present example. Also, the instant the circuit is broken between the contacts 161 and 162, the armature 150 snaps back to permit the spring arm 159 to spring its contact 162 away from the contact 161 and thus stop any arcing.

While I have herein shown and described my invention in the one precise form and a modification thereof, it is obvious that structural variations may be employed such for example as mounting the brushes 36 on the opposite side of the drum 25, and other changes in connections and mountings and the like, all without departing from the spirit of the invention, and I do not therefore desire to be limited to that precise form beyond the limitations that may be imposed by the following claims.

I claim:

1. A timer motor structure comprising an electromagnet having an energizing winding; an armature shiftable in relation to and adjacent and normally biased away from said magnet under non-energized winding condition; a heat responsive bendable member carrying an electrical contact and carried by said armature; an electrical heating element for heating said bendable member; a spring member carried by said armature and carrying an electrical contact in the path of said bendable member contact; said bendable member contact normally bearing compressibly against said spring member contact and maintaining said spring member under a bending strain; a back stop fixed in relation to said magnet in the path of and limiting the strain of said spring member; said spring member contact elastically bearing against said bendable member contact an initial distance upon the bending of the bendable member thereaway under influence of the heat from said heating element when energized and accelerating contact separation under its own spring action upon deenergization of said element, said acceleration being set up by travel of the armature from said magnet.

2. The structure of claim 1 in which said back stop is shiftable under the influence of ambient temperature in directions of travel of said bendable member.

References Cited in the file of this patent

UNITED STATES PATENTS

| | | |
|---|---|---|
| 2,137,507 | Ostline | Nov. 22, 1938 |
| 2,338,731 | Morse | Jan. 11, 1944 |
| 2,423,116 | Price | July 1, 1947 |
| 2,425,459 | Cornelius | Aug. 12, 1947 |
| 2,519,093 | Zoerlein | Aug. 15, 1950 |
| 2,601,010 | Trad | June 17, 1952 |